United States Patent
Stroud

(10) Patent No.: US 8,866,672 B2
(45) Date of Patent: Oct. 21, 2014

(54) COOPERATIVE SYSTEMS AND METHODS FOR TDOA-BASED EMITTER LOCATION

(75) Inventor: Ken A. Stroud, Greenville, TX (US)

(73) Assignee: L-3 Communications Integrated Systems LP, Greenville, TX (US)

( * ) Notice: Subject to any disclaimer, the term of this patent is extended or adjusted under 35 U.S.C. 154(b) by 363 days.

(21) Appl. No.: 13/440,036

(22) Filed: Apr. 5, 2012

(65) Prior Publication Data

US 2013/0265198 A1   Oct. 10, 2013

(51) Int. Cl.
  *G01S 3/16*   (2006.01)
  *G01S 5/02*   (2010.01)
  *G01S 5/06*   (2006.01)
  *G01S 1/04*   (2006.01)
  *G01S 5/00*   (2006.01)

(52) U.S. Cl.
  CPC ............... *G01S 1/04* (2013.01); *G01S 5/0221* (2013.01); *G01S 5/06* (2013.01); *G01S 5/0081* (2013.01)
  USPC .......................................... 342/378

(58) Field of Classification Search
  USPC .......................................... 342/378
  See application file for complete search history.

(56) References Cited

U.S. PATENT DOCUMENTS

| | | | |
|---|---|---|---|
| 4,433,335 A | 2/1984 | Wind | |
| 5,008,679 A | 4/1991 | Effland et al. | |
| 5,317,323 A | 5/1994 | Kennedy et al. | |
| 5,327,144 A | 7/1994 | Stilp et al. | |
| 5,406,291 A | 4/1995 | Guerci et al. | |
| 5,570,096 A | 10/1996 | Knight et al. | |
| 5,570,099 A | 10/1996 | DesJardins | |
| 5,608,410 A | 3/1997 | Stilp et al. | |
| 5,914,687 A | 6/1999 | Rose | |
| 6,018,312 A | 1/2000 | Haworth | |
| 6,255,992 B1 | 7/2001 | Madden | |
| 6,407,703 B1 | 6/2002 | Minter et al. | |
| 6,618,009 B2 | 9/2003 | Griffin et al. | |
| 6,665,332 B1 | 12/2003 | Carlson et al. | |
| 6,677,893 B2 | 1/2004 | Rideout et al. | |

(Continued)

OTHER PUBLICATIONS

Gustafsson et al., "Positioning Using Time-Difference of Arrival Measurements", This Reference Was Available Prior to the Filing Date of the Present Application, 4 pgs.

(Continued)

*Primary Examiner* — Harry Liu
(74) *Attorney, Agent, or Firm* — Egan, Peterman, & Enders LLP.

(57) ABSTRACT

Systems and methods that may be implemented to determine the location of an emitter of electromagnetic radiation having an unknown location, using a cooperative TDOA-based location methodology. The cooperative TDOA-based location methodology (e.g., such as TDOA/TDOA, TDOA/FDOA, etc.) may be implemented using at least one cooperative transmitter that transmits a cooperative electromagnetic (EM) signal from a known location that is received at multiple different EM sensing platforms that are also each of known location. The known geolocation of the cooperative transmitter may be used to resolve the signal arrival timing relationships between the different sensing platforms that is utilized to determine the location of another EM transmitter of unknown location.

28 Claims, 5 Drawing Sheets

(56) References Cited

U.S. PATENT DOCUMENTS

| | | | |
|---|---|---|---|
| 6,734,824 | B2 | 5/2004 | Herman |
| 6,765,531 | B2 * | 7/2004 | Anderson ................ 342/378 |
| 6,853,629 | B2 | 2/2005 | Alamouti et al. |
| 7,456,788 | B2 | 11/2008 | Chung et al. |
| 7,471,245 | B2 | 12/2008 | Chung et al. |
| 7,489,937 | B2 | 2/2009 | Chung et al. |
| 7,508,344 | B2 | 3/2009 | Stroud |
| 7,626,546 | B2 | 12/2009 | Chung et al. |
| 7,664,512 | B2 | 2/2010 | Chung et al. |
| 2004/0027276 | A1 | 2/2004 | Herman |
| 2005/0151093 | A1 | 7/2005 | Zaugg |
| 2011/0117926 | A1 * | 5/2011 | Hwang et al. ............ 455/456.1 |

OTHER PUBLICATIONS

Stilp, Apr. 1, 1997, 2 pgs.
"Guardrail Common Sensor", http://www.globalsecurity.org/intell/systems/guardrail.htm, Printed From Internet Feb. 16, 2005, 11 pgs.
"Basis of Issue Plan—BOIP", Airborne Relay Facility, http://www.fas.org/irp/program/collect/docs/bnM050AE.htm, Printed From Internet Feb. 15, 2005, 2 pgs.
Stein, "Algorithms for Ambiguity Function Processing", IEEE Transactions on Acoustics, Speech and Signal Processing, vol. ASSP-29, No. 3, Jun. 1981, pp. 588-599.

* cited by examiner

COOPERATIVE SYSTEMS AND METHODS FOR TDOA-BASED EMITTER LOCATION

BACKGROUND OF THE INVENTION

1. Field of the Invention

This invention relates generally to location of emitters of electromagnetic radiation, and in particular, to Time Difference of Arrival ("TDOA")-based location of emitters of electromagnetic radiation.

2. Description of the Related Art

TDOA techniques have been employed in the past to determine the location of emitters of electromagnetic radiation, such as radio frequency ("RF") emissions. Using the TDOA technique, the time difference (TDOA) in reception of a radio signal received at multiple spaced sensing platforms may be used to define a hyperboloid upon which the RF emitter of interest is located. TDOA may be used to calculate the geolocation of the RF transmitter if three or more sensing platforms simultaneously capture the radio signal, and if the difference in the times of arrival of the captured radio signal at the different sensing platforms can be accurately determined.

Frequency difference (FDOA) in reception of the same radio signal at two spaced apart moving sensing platforms (such as aircraft) may be generated by moving the two spaced apart sensing platforms at different velocities and headings relative to an RF emitter, and may be used to further resolve the geolocation of the RF emitter on a hyperboloid defined by the TDOA in reception of a radio signal received at the sensing platforms of the two sensing platforms. In this regard, assuming that the RF emitter of interest is located on the surface of the earth, the intersection of the TDOA hyperboloid, the FDOA surface, and the surface of the earth may be employed to determine a set of possible geolocations for the RF emitter. However, only one of these possible geolocations is real, the other possible geolocations in the set are purely mathematical solutions that are not the real location of the radio emitter. To determine the correct geolocation requires additional information. This additional information may be obtained from a system that can produce a line of bearing, from a third aircraft that can measure an independent TDOA/FDOA set of data, or by repositioning the two aircraft and then measuring a second TDOA/FDOA set of data.

TDOA/TDOA and FDOA/FDOA techniques have also been employed in the past to determine the geolocation of emitters of electromagnetic radiation, such as radio frequency ("RF") emissions. For example, using a TDOA/TDOA technique, the time difference (TDOA) in reception of a radio signal received at three spaced apart sensing platforms may be used to define two hyperboloids upon which the RF emitter of interest is located. The intersection of the two TDOA hyperboloids and the surface of the earth may be employed to determine a set of possible geolocations for the RF emitter, which may be further resolved as previously described above. In another example, using a FDOA/FDOA technique, frequency difference (FDOA) in reception of the same radio signal at the three spaced apart sensing platforms may be employed to generate two FDOA curves, and the intersection of the two TDOA hyperboloids and the surface of the earth may be employed to determine a set of possible geolocations for the RF emitter, which also may be further resolved as previously described above.

In a conventional TDOA-based geolocation system architecture, a coordinated timing reference between the sensing platforms must be established so that the difference in the times of arrival of a captured radio signal at the different sensing platforms can be accurately determined. Conventional geolocation methods have used a precision clock source to establish a coordinated timing reference for the different sensing platforms. One type of such a precision clock source is a disciplined rubidium oscillator (DRO) which is slaved to a common clock source such as the one pulse per second (pps) clock provided by a GPS receiver.

SUMMARY OF THE INVENTION

Disclosed herein are systems and methods that may be implemented to determine the location of an emitter of electromagnetic radiation (e.g., RF signal emitter, visible light spectrum emitter, etc.) having an unknown location, using a cooperative TDOA-based location methodology. The cooperative TDOA-based location methodology (e.g., such as TDOA/TDOA, TDOA/FDOA, etc.) may be implemented using at least one cooperative transmitter that transmits a cooperative electromagnetic radiation (EM) signal from a known location that is received at multiple different EM sensing platforms that are also each of known location. Using the disclosed systems and methods, the known geolocation of the cooperative transmitter may be leveraged together with one or more signal timing characteristics of the cooperative EM signal to accurately resolve the signal arrival timing relationships between the different sensing platforms that is necessary to determine the location of another EM transmitter of unknown location.

Using the disclosed systems and methods, TDOA information of a signal of interest from a target EM emitter of unknown location may be gathered at multiple EM sensors configured as EM collection nodes located on different sensing platforms (e.g., such as aircraft platforms), and the location of the target emitter determined using a TDOA-based methodology that employs a cooperative approach to synchronize the timing between the multiple different sensing platforms, e.g., by enabling the solution of time difference between each of the collection nodes in one exemplary embodiment without the use of an external precision timing source such as a disciplined rubidium oscillator (DRO). In one exemplary embodiment, the disclosed systems and methods may be implemented in a manner to resolve the sensing platform timing relationships relative to the unknown signal of interest to be within two times of the error associated with the cross-correlation function, i.e., once for the unknown signal of interest and once for the cooperative signal. In at least some implementations, it is also possible to improve the precision of a final TDOA-based geolocation solution by observing discrepancies in the location accuracies of collection node receivers at the different sensing platforms may be observed in the data analysis (e.g., discrepancies such as the difference between the true actual latitude, longitude, and or altitude and the data reported by a local GPS receiver or inertial navigation system).

In one exemplary embodiment, a cooperative time synchronization approach may be implemented to provide a solution to the timing dependencies required to solve TDOA equations by creating an adjacent channel cooperative EM signal as a timing reference within the EM capture bandwidth of a sensor (or signal collector) at each of the EM sensing platforms in order to resolve the timing relationship between the collection nodes of the sensing platforms. In this regard, the cooperative EM signal may be created at any frequency within the sensor capture bandwidth that substantially does not interfere with the captured target emitter EM signal during the time of capture of the target emitter signal, e.g., the cooperative EM signal may be created adjacent to, but substantially not on top of, the frequency of the captured target emitter EM signal during the time of capture of the target emitter signal at the multiple sensing platforms. For example, when attempting to locate a target EM transmitter signal of interest of unknown location (referred to herein as TXunknown), the center frequency and the bandwidth of the TXunknown may be known. In such a case, an EM capture system may be configured with multiple EM sensing platforms that each have a known capture bandwidth which exceeds the known bandwidth of the TXunknown signal.

In any case, a cooperative EM signal (e.g., such as a TXadj signal) need not be present during the entire capture time duration, but rather only for a duration of time that is long enough to obtain sufficient data from one or more signal timing characteristics of the cooperative EM signal to calculate timing relationship (e.g., by deriving a common clock) between the multiple EM sensing platforms. Such signal timing characteristics may be any measurable characteristic of the cooperative EM signal that is suitable for determining timing relationship between the multiple EM sensing characteristics. Examples of suitable signal timing characteristics include, but are not limited to, time of arrival of the cooperative EM signal itself at each sensing platform or timing of a unique signature in the cooperative EM signal, such as timing of induced changes in the frequency, phase, and/or amplitude of a cooperative EM carrier signal (e.g., time of receipt of a frequency shift in the modulation of the cooperative EM signal carrier at each sensing platform, time of receipt of a frequency shift of the cooperative EM signal carrier at each sensing platform, time of receipt of an induced change in an audio tone included in a cooperative EM signal, time of receipt of an induced change in amplitude of the cooperative EM signal at each sensing platform, time of receipt of an induced change in phase of the cooperative EM signal at each sensing platform, etc.). It will also be understood that a cooperative EM signal may also be optionally created to have characteristics (e.g., bandwidth, frequency, modulation, duration, amplitude, etc.) that are designed to be most advantageously processed by the EM capture system.

In one exemplary embodiment, a cooperative EM signal (referred to herein as TXadj) from a transmitter of known geolocation may be placed directly adjacent on either side of the frequency of the TXunknown signal without overlapping the bandwidth of the TXunknown signal, e.g., center frequency ($f_{CADJ}$) of the TXadj signal may be placed at a distance in frequency ($D_f$) of greater than or equal to about 1.5 times the sum of the bandwidth of TXunknown ($B_{UNK}$) and TXadj ($B_{ADJ}$) in Hertz away from the center frequency ($f_{CUNK}$) of the TXunknown signal so as to be close enough to the known frequency ($f_{CUNK}$) of the TXunknown signal to be within the capture bandwidth of each of the multiple EM sensing platforms as follows:

$$f_{CADJ} = f_{CUNK} \pm D_f$$

where: $D_f \geq 1.5 \times (B_{UNK} + B_{ADJ})$

In this embodiment, when the receiver of each of the EM sensing platforms captures the TXunknown signal, the TXadj will also be captured in the receiver bandwidth due to the closeness of its placement to the frequency of the TXunknown signal. The captured data from the TXadj may then be processed knowing the geolocation of the TXadj transmitter to calculate the timing relationships of the multiple EM sensing platforms relative to each other. The calculated timing relationships of the multiple EM sensing platforms may then be used to process the captured data from the TXunknown signal to calculate the geolocation of the TXunknown signal transmitter.

It will also be understood that in other embodiments the center frequency ($f_{CADJ}$) of the TXadj signal may be placed within at least a portion of the sensor capture bandwidth and/or at a distance in frequency ($D_f$) of less than about 1.5 times the sum of the bandwidth of TXunknown ($B_{UNK}$) and TXadj ($B_{ADJ}$) in Hertz away from the center frequency ($f_{CUNK}$) of the TXunknown signal and such that the TXadj signal creates substantially no interference with the TXunknown signal.

In an alternative embodiment, a TXadj signal may be placed farther away from the TXunknown signal in the frequency domain but at a specific frequency relative to the frequency of the TXunknown signal (e.g., placed at a harmonic of the TXunknown signal) where an image of the signal folds into a close relationship with the TXunknown signal. For example, the center frequency ($f_{CADJ}$) of a TXadj signal may be placed at a frequency distance of greater than about 3 harmonics away from the center frequency ($f_{CUNK}$) of the TXunknown signal, or alternatively placed at a frequency distance of from about 3 harmonics to about 8 harmonics away from the center frequency ($f_{CUNK}$) of the TXunknown signal), or alternatively placed at a frequency distance of about three harmonics away from the center frequency of the TXunknown signal ($f_{CUNK}$). In such an exemplary embodiment, known characteristics of the capture system (e.g., such as the total capture bandwidth) may be leveraged to enable a mathematical solution with reduced possibility of disrupting the TXunknown signal.

In one exemplary embodiment, the disclosed systems and methods may be implemented to geolocate an EM transmitter of unknown location using an airborne TDOA-based EM capture system that has an active transmitter to support the data transfer required to process EM signals captured at different airborne EM sensing platforms. In such an embodiment, the active transmitter may also be employed to transmit a cooperative EM signal, thus eliminating the need for a separate dedicated cooperative transmitter. Thus, the disclosed systems and methods may be implemented in such an embodiment with minimum additional expense over a conventional airborne TDOA-based EM capture system.

In another exemplary embodiment, the disclosed cooperative timing synchronization approach may allow a TDOA emitter location system to be implemented using a smaller and less bulky electronics payload than is typically required for conventional non-cooperative TDOA electronics payloads, and with less dependency on the raw accuracy of the timing signal generated by a given platform. In such an exemplary embodiment, the disclosed systems and methods may be implemented with less expense, and with a smaller size, weight and power (SWAP) profile than is required for conventional non-cooperative TDOA solutions.

In one respect, disclosed herein is a method of determining a time difference of arrival (TDOA) information for an electromagnetic (EM) signal of interest that is transmitted in an EM emissions environment. The method may include: providing multiple EM sensing platforms within the EM emissions environment, the EM emissions environment including the EM signal of interest, and the EM signal of interest having a center frequency and bandwidth; transmitting a cooperative EM signal from a source of known location simultaneously with the transmission of the EM signal of interest; simultaneously capturing each of the EM signal of interest and the cooperative EM signal at each of the multiple EM sensing platforms while the sensing platforms are positioned at different geolocations from each other; deriving a common clock for EM data captured at each given one of the EM sensing platforms based on one or more signal timing characteristics of the EM cooperative signal at the given EM sensing platform and based on the known location of the source of the EM cooperative signal and the known location of the given EM sensing platform at the same time the EM data is captured at each given one of the multiple EM sensing platforms; and determining the time difference of arrival (TDOA) information for the EM signal of interest between at least two of the multiple EM sensing platforms based on the common clock derived based on the one or more signal timing characteristics of the EM cooperative signal at each given one of the EM sensing platforms.

In another respect, disclosed herein is a TDOA determination system, including: multiple EM sensing platforms configured to simultaneously receive EM signals of interest in an EM emissions environment while the EM sensing platforms are positioned at different known geolocations from each other; at least one cooperative EM signal transmission platform including circuitry configured to transmit a cooperative EM signal from the cooperative EM signal transmission platform simultaneously with the transmission of the EM signal of interest while the cooperative EM signal transmission platform has a known geolocation; and TDOA-based processing and control circuitry in signal communication with the multiple EM sensing platforms and the cooperative EM signal transmission platform. The TDOA-based processing and control circuitry may be configured to: derive a common timing relationship for EM data captured at each given one of the EM sensing platforms based on one or more signal timing characteristics of the EM cooperative signal at the given EM sensing platform and based on the known location of the source of the EM cooperative signal and the known location of the given EM sensing platform at the same time the EM data is captured at each given one of the multiple EM sensing platforms; and determine the time difference of arrival (TDOA) information for the EM signal of interest between at least two of the multiple EM sensing platforms based on the timing relationship derived based on the one or more signal timing characteristics of the EM cooperative signal at each given one of the EM sensing platforms.

In another respect, disclosed herein is a cooperative EM signal transmission platform, including: a communication antenna; transceiver or transmitter circuitry coupled to the communications antenna and configured to communicate with one or more EM sensing platforms in an EM emissions environment; TDOA-based processing and control circuitry coupled to the transceiver circuitry and being configure to communicate with the multiple EM sensing platforms to receive EM data from each of the multiple EM sensing platforms via the transceiver circuitry and communications antenna, the TDOA-based processing and control circuitry being configured to determine the time difference of arrival (TDOA) information for an EM signal of interest between at least two of the multiple EM sensing platforms based on a common timing relationship derived based on one or more signal timing characteristics of an EM cooperative signal at each given one of the EM sensing platforms; and cooperative transmitter and processing control circuitry coupled to the transceiver or transmitter circuitry configured to cause transmission of the cooperative EM signal from the cooperative EM signal transmission platform via the transceiver or transmitter and the communication antenna.

In another respect, disclosed herein is a method of operating a cooperative EM signal transmission platform in an EM emissions environment, including: providing a cooperative EM signal transmission platform. The cooperative EM signal transmission platform may include: a communication antenna; transceiver or transmitter circuitry coupled to the communications antenna; TDOA-based processing and control circuitry coupled to the transceiver or transmitter circuitry; and cooperative transmitter and processing control circuitry coupled to the transceiver or transmitter circuitry. The method may also include: using the TDOA-based processing and control circuitry to communicate with multiple other EM sensing platforms in the EM emissions environment to receive EM data from each of the multiple EM sensing platforms via the transceiver circuitry and communications antenna; using the TDOA-based processing and control circuitry to determine the time difference of arrival (TDOA) information for an EM signal of interest between at least two of the multiple EM sensing platforms based on a common clock derived based on one or more signal timing characteristics of an EM cooperative signal at each given one of the EM sensing platforms; and using the cooperative transmitter and processing control circuitry to cause transmission of the cooperative EM signal from the cooperative EM signal transmission platform via the transceiver or transmitter and the communication antenna.

DESCRIPTION OF ILLUSTRATIVE EMBODIMENTS

Figure 1:
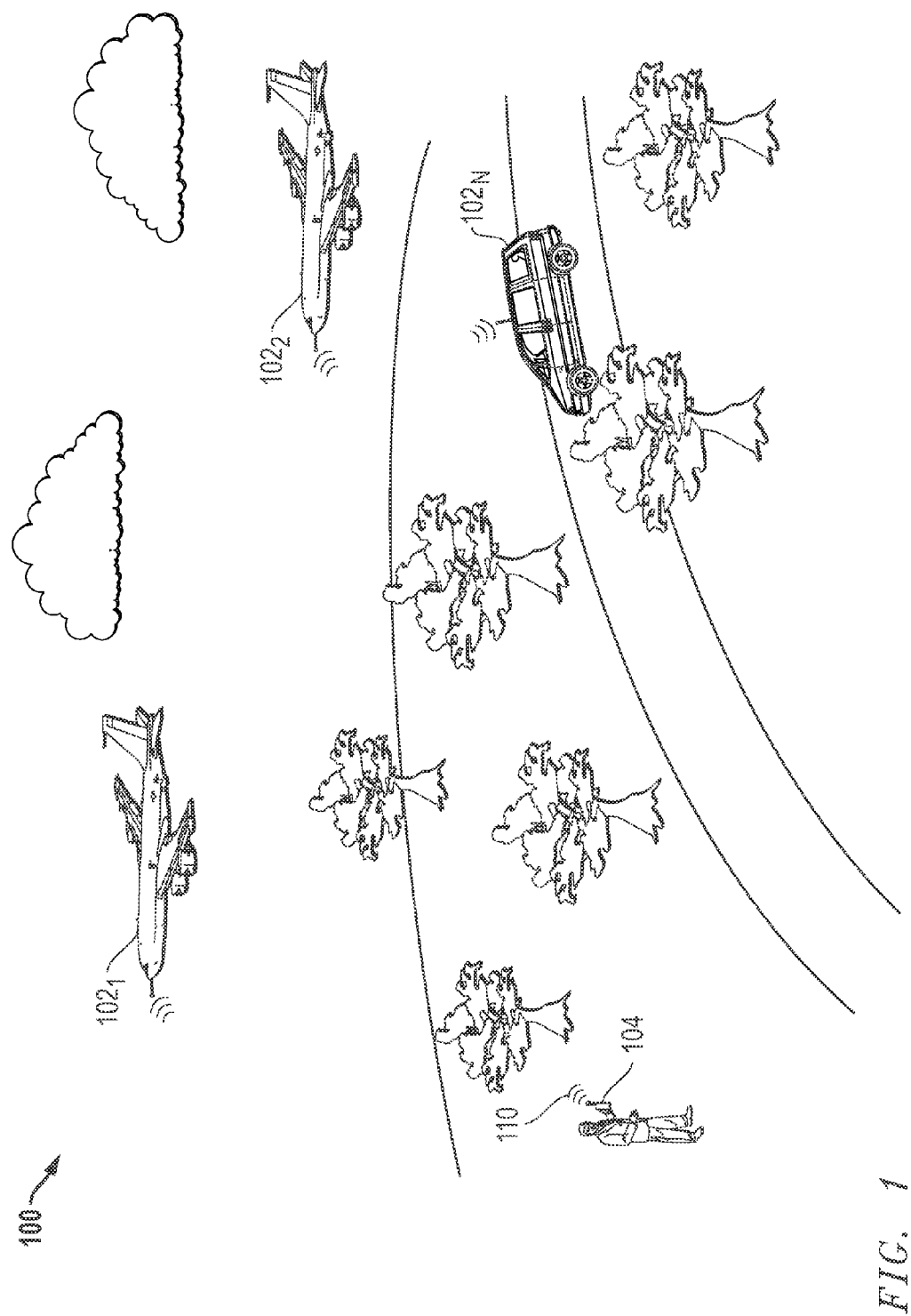
FIG. 1 illustrates an EM emissions environment according to one exemplary embodiment of the disclosed systems and methods.

FIG. 1 illustrates one exemplary embodiment of an EM emissions environment 100 (in this case a radio communication environment) in which an emitter in the form of transmitter 104 at an unknown location is transmitting a target EM signal of interest 110 (TXunknown), e.g., in this case a radio frequency (RF) signal. In the illustrated embodiment, the illustrated emitter 104 is a ground-based mobile emitter (e.g., cell phone, push to talk radio, etc.) carried by a human being that is stationary and emitting from a fixed location. However, it will be understood that the disclosed systems and methods may be practiced in radio communication environments in which any type, number and/or combination of different types of emitters are transmitting on a one or more frequencies including, but are not limited to, base stations of a cellular telephone network, cell phone devices, weather broadcast stations, radar signal sources, microwave sources, etc. Furthermore, besides being hand carried, an emitter may be vehicle-borne (e.g., borne by automobile, ship, train, aircraft, etc.), or may be permanently-fixed (e.g., fixed at a house or building, fixed on a transmission tower, etc.). Thus, an emitter may be either moving or stationary.

Still referring to FIG. 1, radio communication environment 100 also includes multiple mobile sensing platforms $102_1$ and $102_2$ through $102_N$ (with N being equal to the total number of multiple sensing platforms in a given system) that each receive radio signal 110 emitted by emitter 104 of FIG. 1. In this regard, the disclosed systems and methods may be implemented with more than three sensing platforms (e.g., with sensing platforms $102_3$, $102_4$, etc.) or as few as two sensing platforms (e.g., only $102_1$ and $102_2$). For detection and location of emitters using TDOA/FDOA processing, two or more sensing platforms may be employed, with at least one of the sensing platforms moving relative to the emitter/s. Alternatively, TDOA/TDOA processing techniques may be employed using three or more sensing platforms, with at least two of the sensing platforms moving.

In the exemplary embodiment of FIG. 1, mobile sensing platforms $102_1$ and $102_2$ are each provided in the form of airborne-based signal collection platforms mounted on an aircraft, and mobile sensing platform $102_N$ is provided in the form of a ground-based collection platform mounted on an automobile. However, although manned aircraft are illustrated as mobile sensing platforms in FIG. 1, a mobile sensing platform may be any other type of vehicle or movable device that is suitable for containing or otherwise supporting one or more EM sensors and moving relative to an EM emitter and to other mobile sensing platforms in a manner that allows determination of emitter geolocation in the manner described herein. In this regard, one or more of the mobile sensing platforms 102 may be moving at different velocities and/or headings relative to each other, and/or relative to the emitter 104 at the time of capture of the EM signal of interest 110.

Examples of other types of mobile sensing platforms include, but are not limited to, other types of aerial vehicles (e.g., unmanned aerial vehicles (UAVs), helicopters, etc.), space vehicles (e.g., satellites, missiles, etc.), surface vehicles (e.g., submarines, boats, trains, cars, trucks, etc.), etc. Furthermore, it will also be understood that the disclosed systems and methods may be implemented using one or more stationary sensing platforms and/or using any other type, number and/or combination of different types of mobile and/or stationary signal collection platforms including, but are not limited to, hand-carried platforms, vehicle-borne platforms (e.g., borne by automobile, ship, train, space vehicles, etc.), stationary platforms (e.g., fixed at a house or building, fixed on a transmission tower, etc.), a combination thereof, etc. Additionally, the disclosed systems and methods may be implemented in one embodiment to retrofit an existing emitter location system by modification of system EM sensing platforms in a manner as will be described further herein.

Figure 2:
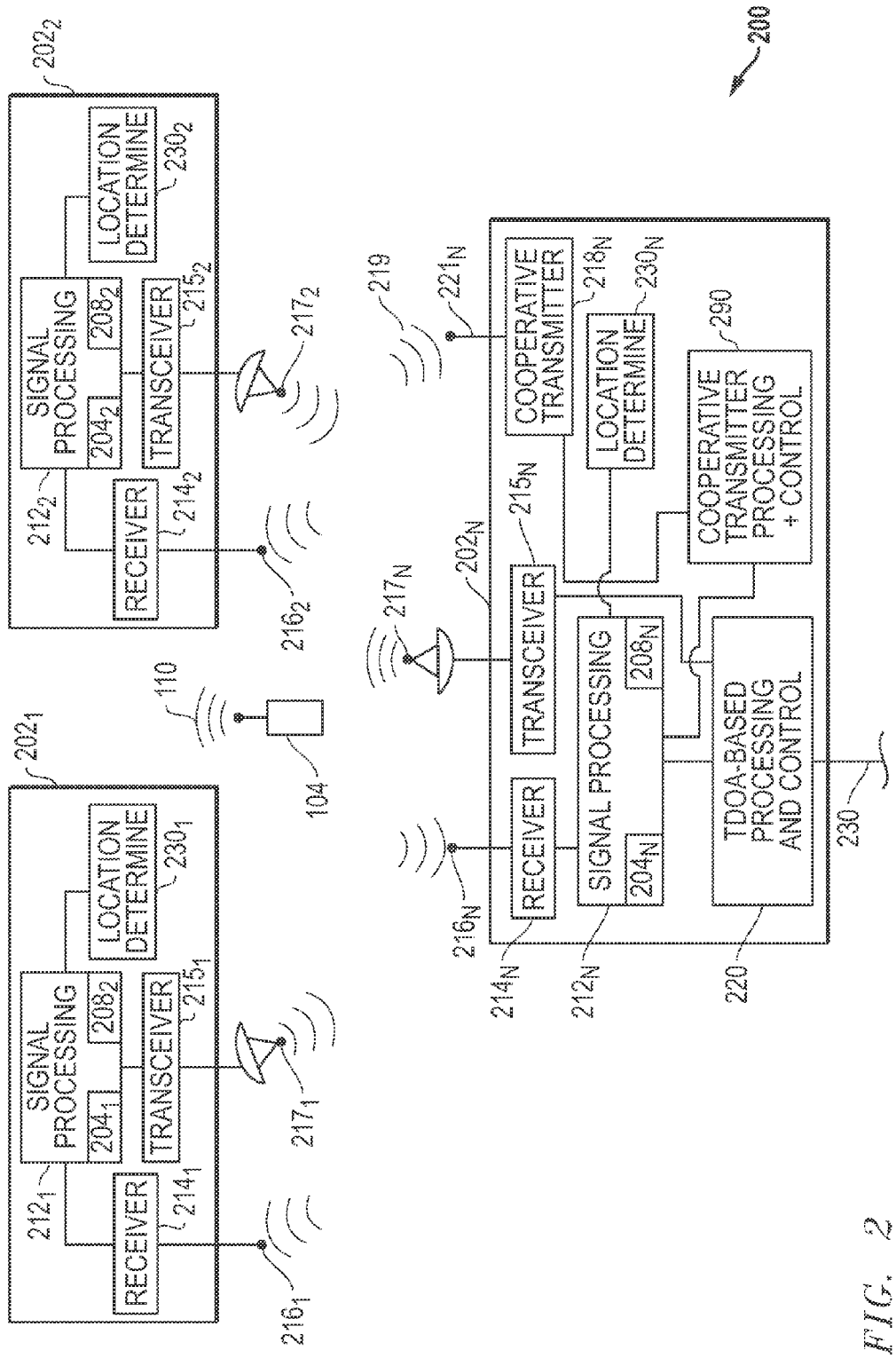
FIG. 2 illustrates a simplified block diagram of an emitter location system according to one exemplary embodiment of the disclosed systems and methods.

FIG. 2 illustrates a simplified block diagram of an emitter location system 200 according to one exemplary embodiment of the disclosed systems and methods that includes a first sensing platform $202_1$, a second sensing platform $202_2$, and a third sensing platform $202_n$ that is also configured to perform cooperative transmission tasks, as well as TDOA-based geolocation processing. In one exemplary embodiment, first sensing platform $202_1$ may correspond to airborne sensing platform $102_1$ of FIG. 1, second sensing platform $202_2$ may correspond to airborne sensing platform $102_2$ of FIG. 1, and third sensing platform $102_N$ may correspond to mobile earth-based third sensing platform of FIG. 1 that are positioned within wireless signal communication range of each other.

Although third sensing platform $202_N$ is illustrated in the exemplary embodiment of FIG. 2 as configured to perform as a cooperative EM transmitter, it will be understood that cooperative transmitter components and functionality may be alternatively or additionally implemented on first and/or second sensing platforms $202_1$ or $202_2$, and/or may be configured as part of a stand alone cooperative transmitter platform that does not include emitter sensing components and that is positioned at a geographically different location than the multiple EM sensing platforms 202 of the emitter location system 200. Similarly, although illustrated in FIG. 2 provided as a component of third sensing platform $202_N$, it will be understood that components and functionality of TDOA-based geolocation processing may alternatively be located on first and/or second sensing platforms $202_1$ or $202_2$, or may be configured as part of a stand alone TDOA-based processing and control platform that does not include emitter sensing components. It will also be understood that a cooperative transmitter and/or TDOA-based geolocation processing may either or both be provided as components of a separate processing platform configured for operation in any suitable location and/or environment, e.g., configured as a separate stationary earth-based platform, airborne processing platform, ship-based platform, space-based platform, etc. Furthermore, although third sensing platform $202_N$ of FIG. 2 is configured to be a cooperative transmitter and to perform TDOA-based geolocation processing, it will be understood that an emitter location system may include one or more other platforms that are configured to alternatively or additionally emit cooperative EM transmissions and/or to perform TDOA-based geolocation processing.

Sensing platform $202_N$ of FIG. 2 is shown provided with a sensor antenna $216_1$ that is coupled to signal processing circuitry $212_1$ via receiver $214_1$ (e.g., configured as a tunable receiver with analog to digital converter) to form a first signal collection node, sensing platform $202_2$ is shown provided with a sensor antenna $216_2$ that is coupled to signal processing circuitry $212_2$ via receiver $214_2$ to form a second signal collection node, and sensing platform $202_N$ is shown provided with a sensor antenna $216_N$ that is coupled to signal processing circuitry $212_N$ via receiver $214_N$ to form a third signal collection node. In the illustrated exemplary embodiment of FIG. 2, sensing platform $202_N$ also includes TDOA-based processing and control circuitry 220 that that is coupled to signal processing circuitry $212_n$ and configured to output emitter geolocation information 230 as will be described further herein. As so configured in this embodiment, sensing platform $202_N$ is configured with components that act as a master controller for communicating and controlling operation of participating collection nodes corresponding to sensing platforms $202_1$ and $202_1$, and to the collection node components of sensing platform $202_N$. In this exemplary embodiment, sensing platform $202_N$ is also configured as a TDOA-based processing node (e.g., TDOA/TDOA or TDOA/FDOA processing node) for data collected by signal collection nodes of sensing platforms 202.

In the illustrated embodiment of FIG. 2, sensor antennas $216_1$, $216_2$ and $216_N$ are each provided with respective receivers $214_1$, $214_2$ and $214_N$ to receive signals emitted by multiple RF emitters (e.g., RF emitters 104 of FIG. 1) in a manner as described elsewhere herein. Each of receivers $214_1$, $214_2$ and $214_N$ may in turn be configured to provide signals received by respective sensor antennas $216_1$, $216_2$ and $216_N$ in sampled digital form to respective signal processing circuitry $212_1$, $212_2$ and $212_N$ of its corresponding sensing platform 202. In this regard, each of signal processing circuitry $212_1$, $212_2$ and $212_N$ and TDOA-based processing and control circuitry 220 may include a digital signal processor ("DSP") and/or any combination of one or more processing device circuit components (e.g., processor/s, microprocessor/s, controllers, microcontrollers, CPUs, volatile or non-volatile memory, etc.) suitable for processing received emitter signals on a time and/or frequency basis (e.g., time measurement/tagging of received emitter signals, frequency measurement of received emitter signals, etc.) suitable for further use in performing TDOA-based processing in a manner as described elsewhere herein. In the exemplary embodiment of FIG. 2, each of signal processing circuitry $212_1$, $212_2$ and $212_N$ includes one or more respective processing devices 204 (e.g., CPU, controller, microcontroller, processor, microprocessor, FPGA, ASIC, or any other suitable processing device etc.) and local memory and/or memory buffer 208 (e.g., non-volatile memory, volatile memory, combination of non-volatile and volatile memory) for TDOA-based processing as will be described further herein.

Still referring to the exemplary embodiment of FIG. 2, sensing platform $202_1$ is shown provided with a communication antenna $217_1$ that is coupled to signal processing circuitry $212_1$ via transceiver $215_1$, and sensing platform $202_2$ is shown provided with a communication antenna $217_2$ that is coupled to signal processing circuitry $212_2$ via transceiver $215_2$. In such a configuration, transceiver $215_1$ may be provided to transmit processed emitter signal information from signal processing circuitry $212_1$ to a TDOA-based processing node of another platform (e.g., such as third sensing platform $202_N$ of FIG. 2 or a stand-alone platform that includes TDOA-based processing components) via communication antenna 217. Transceiver $215_1$ may also be configured to provide control signals or other information to signal processing circuitry $212_1$ that is received from TDOA-based processing control components of another platform via communication antenna $217_1$. Likewise, transceiver $215_2$ may also be configured to provide control signals or other information to signal processing circuitry $212_2$ that is received from TDOA-based processing and control circuitry of a separate platform via communication antenna $217_2$.

In FIG. 2, third sensing platform $202_N$ is shown provided with a communication antenna $217_N$ that is coupled to TDOA-based processing and control circuitry 220 via transceiver $215_n$. In such a configuration, communication antenna $217_N$ is provided to receive processed emitter signal information from each of sensing platforms $202_1$ and $202_2$ and to provide this information to TDOA-based processing and control circuitry 220 for further processing, and signal processing circuitry $212_N$ of sensing platform $202_N$ is configured to provide emitter signal information of sensing platform $202_N$ directly to TDOA-based processing and control circuitry 220 for further processing. In this regard, emitter signal information from sensing platforms $202_1$, $202_2$ and $202_N$ may be processed by TDOA-based processing and control circuitry 220 for generation of TDOA-based data sets and separation, geolocation, and/or determination of the number of emitters transmitting on a common RF frequency. Transceiver $215_N$ may also be configured to transmit control signals or other information from TDOA-based processing and control circuitry 220 to sensing platforms $202_1$ and $202_2$ via communication antenna $217_n$. It will be understood that tasks of transceivers $215_1$, $215_2$ and $215_N$ may alternatively be implemented with separate transmitter and/or receiver circuitry on each sensing platform 202.

In this embodiment, third sensing platform $202_N$ is also shown provided with cooperative transmitter processing and control circuitry 290 that is coupled to control transmission of a cooperative EM signal transmission (e.g., RF signal) 219 as described elsewhere herein from a known geolocation (and optionally at a known time) from cooperative transmitter circuitry $218_N$ and coupled cooperative transmission antenna $221_N$ to each of first and second sensing platforms $202_1$ and $202_2$. In one embodiment, cooperative transmitter processing and control circuitry 290 may be implemented by the same circuit components (e.g., DSP, etc.) as utilized to implement TDOA-based processing and control circuitry 220, although separate cooperative transmitter processing and control circuitry 290 and/or any other combination of one or more circuit components (e.g., processor/s, microprocessor/s, volatile or non-volatile memory, etc.) may be employed that is suitable for controlling and/or processing cooperative EM transmission signals from third sensing platform $202_n$ in a manner as described elsewhere herein. In one exemplary embodiment, one or more sensing platform components of an existing conventional emitter location system may be retrofitted to implement the disclosed systems and methods, e.g., by addition of cooperative transmitter processing and control circuitry 290 to at least one of the sensing platforms 202 of an emitter location system 200 that was not originally equipped with this circuitry.

Cooperative transmitter processing and control circuitry 290 may be configured in one embodiment to produce a cooperative EM signal that is based at least in part on the frequency and/or bandwidth characteristics of a target EM signal of interest (TXunknown) 110 having an unknown location that is detected by one or more of multiple EM sensing platforms $202_1$ to $202_N$. For example, in the illustrated embodiment, signal processing circuitry $212_N$ may determine frequency and bandwidth of a target EM signal of interest (TXunknown) 110 that is received directly by antenna $216_N$ of EM sensing platform $202_N$, and provide this information to cooperative transmitter processing and control circuitry 290. In another example, cooperative transmitter processing and control circuitry 290 may obtain frequency and/or bandwidth information about target EM signal of interest (TXunknown) 110 received by communication antenna $217_N$ from at least one of sensing platforms $202_1$ or $202_2$. In any case, cooperative transmitter processing and control circuitry 290 may be configured to respond to this frequency and bandwidth information by producing an adjacent cooperative EM signal (TXadj) that has a bandwidth and frequency (e.g., with a center frequency greater than or equal to about 1.5 times the sum of the bandwidth of TXunknown and TXadj Hz away from the center frequency of the EM signal of interest 110) so as to be close enough to the known frequency of the EM signal of interest (TXunknown) 110 to be within the capture bandwidth of the receiver 214 of each of the multiple EM sensing platforms $202_1$ and $202_2$.

Thus, in one exemplary embodiment, center frequency ($f_{CADJ}$) of the TXadj signal may be placed at a distance in frequency ($D_f$) of greater than or equal to about 1.5 times the sum of the bandwidth of TXunknown ($B_{UNK}$) and TXadj ($B_{ADJ}$) in Hertz away from the center frequency ($f_{CUNK}$) of the TXunknown signal so as to be close enough to the known frequency ($f_{CUNK}$) of the TXunknown signal to be within the capture bandwidth of each of the multiple EM sensing platforms as follows:

$$f_{CADJ} = f_{CUNK} \pm D_f$$

where: $D_f \geq 1.5 \times (B_{UNK} + B_{ADJ})$

As previously described, in other embodiments center frequency ($f_{CADJ}$) of the TXadj signal may be placed at a distance in frequency ($D_f$) of less than about 1.5 times the sum of the bandwidth of TXunknown ($B_{UNK}$) and TXadj ($B_{ADJ}$) in Hertz away from the center frequency ($f_{CUNK}$) of the TXunknown signal and such that it creates substantially no interference with the TXunknown signal.

In an alternative embodiment, cooperative transmitter processing and control circuitry 290 may be configured to respond to this frequency and bandwidth information by producing a cooperative EM signal that has a bandwidth and frequency relative to the EM signal of interest (TXunknown) 110 such that the image of the cooperative EM signal signal folds into a close relationship (e.g., defined as being within the capture bandwidth of TXunknown but not overlapping TXunknown) with the EM signal of interest (TXunknown) 110 that is captured by the receiver 214 of each of the multiple EM sensing platforms $202_1$ and $202_2$.

As further shown in FIG. 2, each of sensing platforms $202_1$, $202_2$, and $202n$ include location determination circuitry $230_1$, $230_2$, and $230_N$, respectively, that is present for determining the current real-time geolocation of its respective platform at a time simultaneous with signal capture on that respective platform for use in TDOA-based geolocation calculations. Examples of location determination circuitry include, but are not limited to, global positioning system (GPS) circuitry, digital receiver/s, tuner/s, filter/s, one or more processors programmed to execute signal processing algorithm/s, inertial navigation subsystem/s, etc. The determined geolocation of each respective EM sensing platform 202 may be communicated as necessary (e.g., together with simultaneous signal capture time information) to one or more other EM sensing platforms 202 of the emitter location system 200. For example, each of EM sensing platforms $202_1$ and $202_2$ may transmit its geolocation information at time of capture of a given emitter signal to EM sensing platform $202_N$ via the respective platform transceiver 215 and communication antenna 217.

Still referring to FIG. 2, signal processing circuitry 212 of each of EM sensing platforms $202_1$ and $202_2$ may be configured in one exemplary embodiment to receive and process the EM signal of interest 110 together with the cooperative EM signal (or a folded image thereof) received from sensing platform $202_N$ on a time and frequency basis including, for example, time measurement/tagging of one or more signal timing characteristics of the received cooperative EM signal (or a folded image thereof) received from sensing platform $202_N$. Examples of such signal timing characteristics include, but are not limited to, time of arrival of the cooperative EM signal itself at each sensing platform or timing of a unique signature in the cooperative EM signal such as time of receipt of an induced modulation change within the cooperative EM signal at each sensing platform, time of receipt of an induced frequency shift of the cooperative EM signal at each sensing platform, time of receipt of an induced change in an audio tone included in a cooperative EM signal, time of receipt of an induced change in amplitude of the cooperative EM signal at each sensing platform, time of receipt of an induced change in phase of the cooperative EM signal at each sensing platform, etc. In this regard, one or more signatures or other characteristics in a cooperative EM (e.g., such as induced modulation changes, induced tone changes, induced frequency shifts, etc.) may be transmitted from sensing platform $202_N$ or other suitable cooperative EM signal source from a known geolocation and at a known time to each of first and second sensing platforms $202_1$ and $202_2$.

The processed cooperative EM signal time and frequency information from signal processing circuitry 212 of each of EM sensing platforms $202_1$ and $202_2$ may be communicated to TDOA-based processing and control circuitry 220 of EM sensing platform $202_N$ (e.g., together with the determined geolocation information for each respective platform at time of signal capture), which may be configured to process the cooperative EM signal time and frequency information together with the known geolocation of EM sensing platform $202_N$ to calculate the timing relationships of the multiple EM sensing platforms $202_1$, $202_2$ and $202_N$ relative to each other at the time of receipt of the cooperative EM signal together with the EM signal of interest 110. In this embodiment, the timing relationships may be determined by virtue of knowledge of the timing and frequency characteristics of the cooperative EM signal transmitted and received from the known location of EM sensing platform $202_N$. These calculated timing relationships of the multiple EM sensing platforms $202_1$, $202_2$ and $202_N$ may then be used by TDOA-based processing and control circuitry 220 to process the captured data from EM signal of interest 110 to calculate the emitter geolocation information 230 of the emitter 104 of unknown location. Although not necessary to calculate the timing relationships of the multiple EM sensing platforms $202_1$, $202_2$ and $202_N$ or to calculate the emitter geolocation information 230 of the emitter 104, time of transmission from EM sensing platform $202_N$ may be optionally recorded and used in geolocation processing if so desired (e.g., time of transmission of the cooperative EM signal from EM sensing platform $202_N$, or time of transmission of a unique or identifiable signature in the cooperative EM signal from EM sensing platform $202_N$ such as time of transmission of an induced modulation change within the cooperative EM signal, time of transmission of an induced frequency shift in the cooperative EM signal, etc.).

It will be understood that the above description of FIG. 2 is exemplary only, and that the disclosed systems and methods may be implemented in any other manner and/or configuration that is suitable for cooperative geolocation of an EM emitter of unknown location. For example, cooperative transmitter processing and control circuitry 290 may be configured in another embodiment to produce a cooperative EM signal that is independent of the frequency and/or bandwidth characteristics of a target EM signal of interest 110. In such an alternative embodiment, cooperative transmitter processing and control circuitry 290 may be configured to produce an independent cooperative EM signal that has bandwidth and frequency different than the EM signal of interest 110 (e.g., and not within the same sensor capture bandwidth as the target signal of interest 110), and to transmit this independent cooperative EM signal from communication antenna $217_N$ for reception by communication antennas $217_1$ and $217_2$, or alternatively for reception by other antennas (not shown) that may be optionally provided respectively on each of EM sensing platforms $202_1$ and $202_2$ separate and independent from antennas 216 and 217 of each platform. Respective signal processing circuitry $212_1$ and $212_2$ of each of EM sensing platforms $202_1$ and $202_2$ may be in turn configured receive and process the independent cooperative EM signal received from sensing platform $202_N$ by respective antennas $217_1$ and $217_2$ on a time and frequency basis including, for example, time measurement/tagging of one or more signal timing characteristics of the received cooperative EM signal in a manner as previously described. As before, this independent cooperative EM signal time and frequency information may be communicated to TDOA-based processing and control circuitry 220 of EM sensing platform $202_N$, which may be configured to process the independent cooperative EM signal time and frequency information together with the known geolocation of EM sensing platform $202_N$ to calculate the timing relationships of the multiple EM sensing platforms $202_1$, $202_2$ and $202_N$ relative to each other at the time of receipt of the independent cooperative EM signal together with the EM signal of interest 110.

In yet another embodiment, a cooperative EM signal may be transmitted from a separate EM transmitter platform of known geolocation that is at a different location from any of multiple EM sensing platforms $202_1$, $202_2$ and $202_N$. In such a case, the transmitted cooperative EM signal may be either transmitted (optionally at a known time) within the capture bandwidth of the receiver 214 of each of the multiple EM sensing platforms $202_1$, $202_2$ and $202_N$; or may be an independent cooperative EM signal that has a bandwidth and frequency different than the EM signal of interest 110 as described above. In either case, processing by emitter location system 200 may be performed in a similar manner as previously described, with the exception that cooperative transmitter geolocation (and optionally the recorded cooperative EM signal transmission time) information may be transmitted to EM sensing platform $202_N$ such that the known geolocation of the separate EM transmitter may be processed by TDOA-based processing and control circuitry 220 of EM sensing platform $202_N$ together with cooperative EM signal time and frequency information from signal processing circuitry 212 of each of EM sensing platforms $202_1$ and $202_2$ (e.g., together with the determined geolocation information for each respective platform at time of signal capture) to calculate the timing relationships of the multiple EM sensing platforms $202_1$, $202_2$ and $202_N$ relative to each other at the time of receipt of the cooperative EM signal from the separate transmitter platform.

Figure 3:
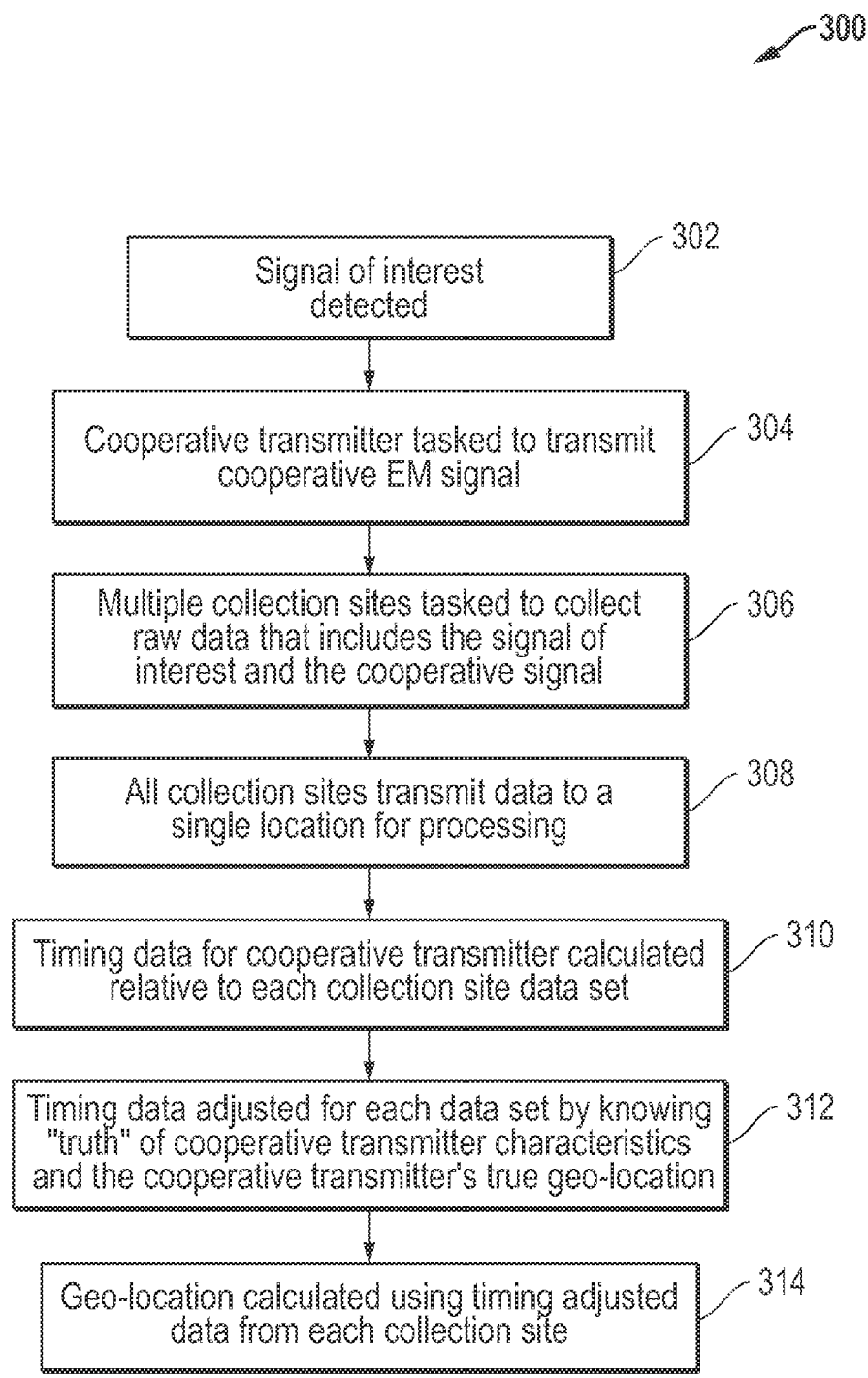
FIG. 3 illustrates methodology according to one exemplary embodiment of the disclosed systems and methods.

FIG. 3 illustrates methodology 300 that may be implemented in one exemplary embodiment to determine the location of an EM emitter having an unknown location using a cooperative TDOA-based location methodology (e.g., such as TDOA/TDOA, TDOA/FDOA, etc.). Although described in relation to the embodiments of FIGS. 1 and 2, it will be understood that methodology 300 may be implemented by any other configuration of TDOA-based emitter location system in combination with any other alternative EM emissions environment to determine the geolocation of an EM emitter of unknown location.

Figure 4:
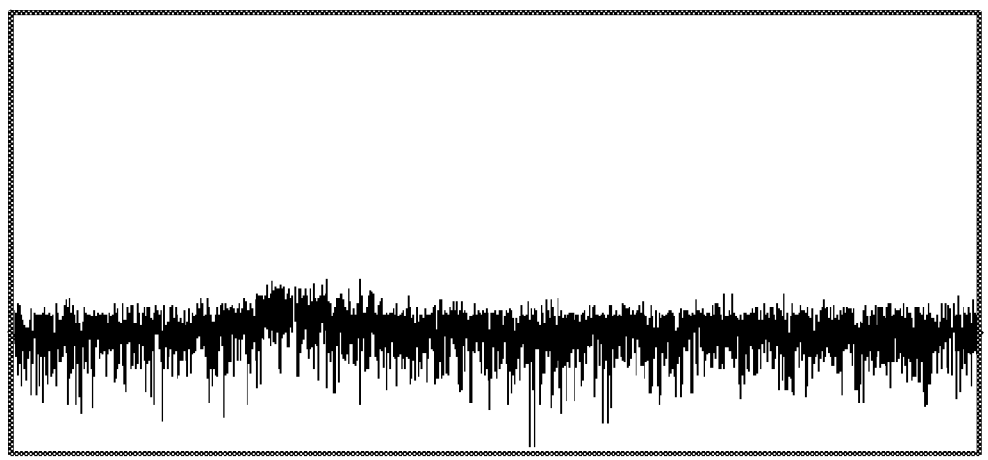
FIG. 4 illustrates an amplitude versus frequency spectrogram of an EM emissions environment according to one exemplary embodiment of the disclosed systems and methods.
Figure 5:
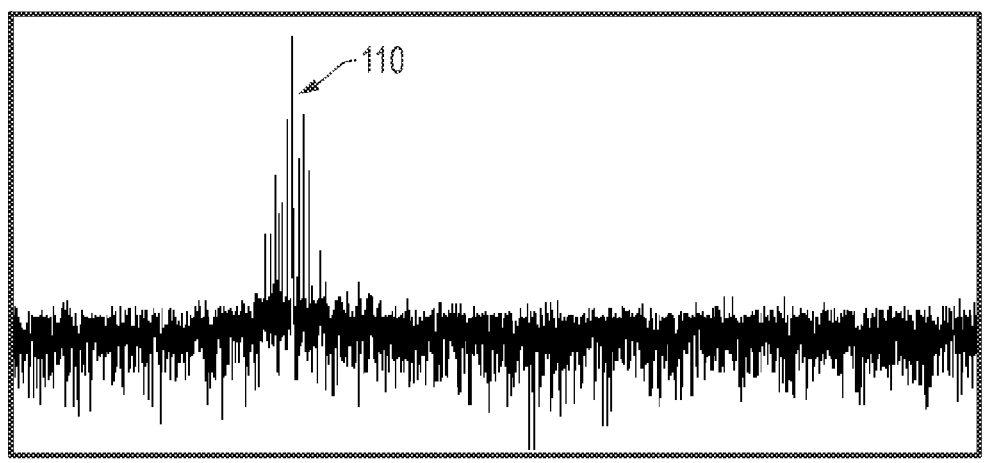
FIG. 5 illustrates an amplitude versus frequency spectrogram of an EM emissions environment according to one exemplary embodiment of the disclosed systems and methods.

As shown, methodology 300 starts in step 302 where a signal of interest 110 (having an unknown location) is detected by one or more EM sensing platforms 202 or other suitable EM monitoring device (e.g., such as an EM scanner) of a TDOA-based emitter location system. As an example, FIG. 4 illustrates an amplitude versus frequency spectrogram of background noise present in an EM emissions environment 100 absent a transmitted signal of interest 110, and FIG. 5 illustrates an amplitude versus frequency spectrogram of the same EM emissions environment 100 during transmission of a detected signal of interest 110 (showing of background noise and signal of interest 110). The frequency characteristics (e.g., center frequency and/or bandwidth) of the detected signal of interest 110 is also determined in step 302.

In response to the detected signal of interest 110 and its determined frequency characteristics, a cooperative EM transmitter of the emitter location system (e.g., such as transceiver $215_N$ or other transmitter circuitry of EM system platform $202_N$ or cooperative transmitter or transceiver of another suitable platform) is next tasked in step 304 to transmit a cooperative EM signal. In one embodiment, the transmitted frequency of the cooperative EM signal may be based on the detected frequency of the signal of interest 100, e.g., such that the cooperative EM signal is transmitted as an adjacent cooperative EM signal (TXadj) that is generated spectrally close to the signal of interest 110. It will be understood that the distance that the center frequency of the cooperative EM signal may be placed relative to the center frequency of the signal of interest 110 may vary based, for example, on the bandwidth of the digital sampling receiver circuitry 214 of the EM sensing platforms 202, e.g., receiver circuitry having faster analog to digital conversion (ADC) circuitry may be capable of capturing a wider bandwidth collection frequency window so as to allow placement of a cooperative EM signal further away in frequency from the signal of interest 110.

Figure 6:
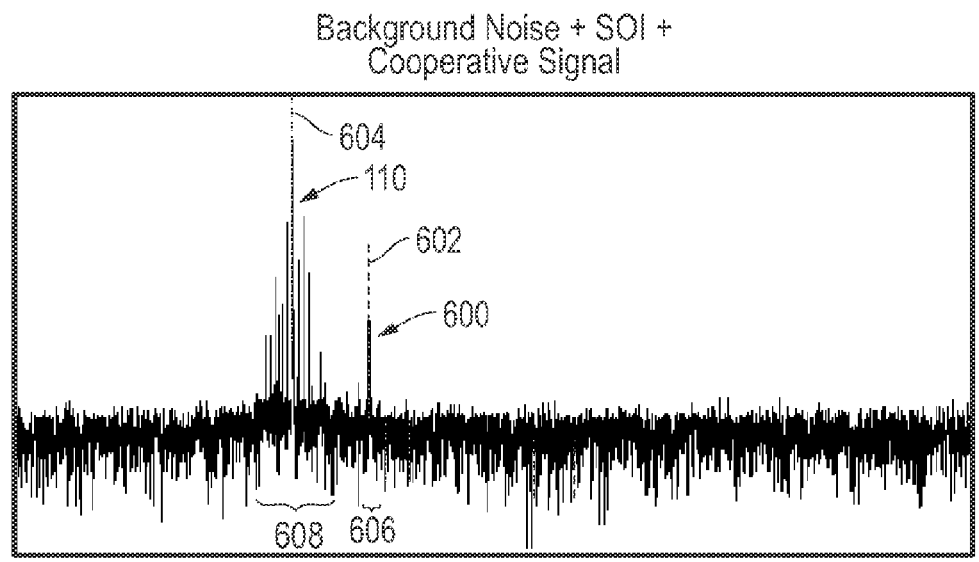
FIG. 6 illustrates an amplitude versus frequency spectrogram of an EM emissions environment according to one exemplary embodiment of the disclosed systems and methods.

In this regard, FIG. 6 illustrates an amplitude versus frequency spectrogram of the same EM emissions environment 100 of FIG. 5 as it exists during transmission of a cooperative EM signal 600 by the tasked cooperative EM transmitter (showing background noise, signal of interest 110 and transmitted cooperative EM signal 600). As shown in the exemplary embodiment of FIG. 6, the center frequency 602 of the cooperative EM signal 600 is transmitted adjacent to the center frequency 604 of the signal of interest 110 (e.g., at a frequency distance range of greater than or equal to about 1.5 times the sum of the bandwidths of TXunknown and TXadj) and with a bandwidth 606 that does not overlap the bandwidth 608 of the signal of interest 110. However, it will be understood that the transmitted cooperative EM signal may be alternatively transmitted in another embodiment as an independent cooperative EM signal in a manner as previously described.

Additionally upon detection of the signal of interest 110, multiple sensing platform collection sites (e.g., sensing platforms $202_1$, $202_2$ and $202_N$) may be tasked in step 306 to collect raw EM signal data that includes the signal of interest 110 from an emitter 104 of unknown location together with the transmitted cooperative EM signal. For example, emitter signal collection may be synchronously initiated by TDOA-based processing and control circuitry of sensing platform $202_N$ acting as a master controller to task all participating signal collection nodes (e.g., signal collection nodes of sensing platforms $202_1$ and $202_2$ of FIG. 2). In this regard, TDOA-based processing and control circuitry of sensing platform $202_N$ may transmit tasking information to signal collection node components (e.g., receiver/tuner components $214_a$ and $214_b$, signal processing circuitry $212_1$ and $212_2$) of each sensing platform $202_1$ and $202_2$ by RF datalink provided by communication antennas 217, and may provide tasking information by internal datalink to signal collection node components (e.g., receiver/tuner components $214_n$, signal processing circuitry $212_n$) within sensing platform $202_n$. Such tasking information may include, for example, specification of the signal frequency, collection bandwidth, signal bandwidth and collection duration to screen the received signals. When collection node components of a each sensing platform receives the tasking information via a datalink, the collection hardware asset (e.g., antenna, RF receiver/tuner, etc.) is scheduled accordingly.

Figure 7:
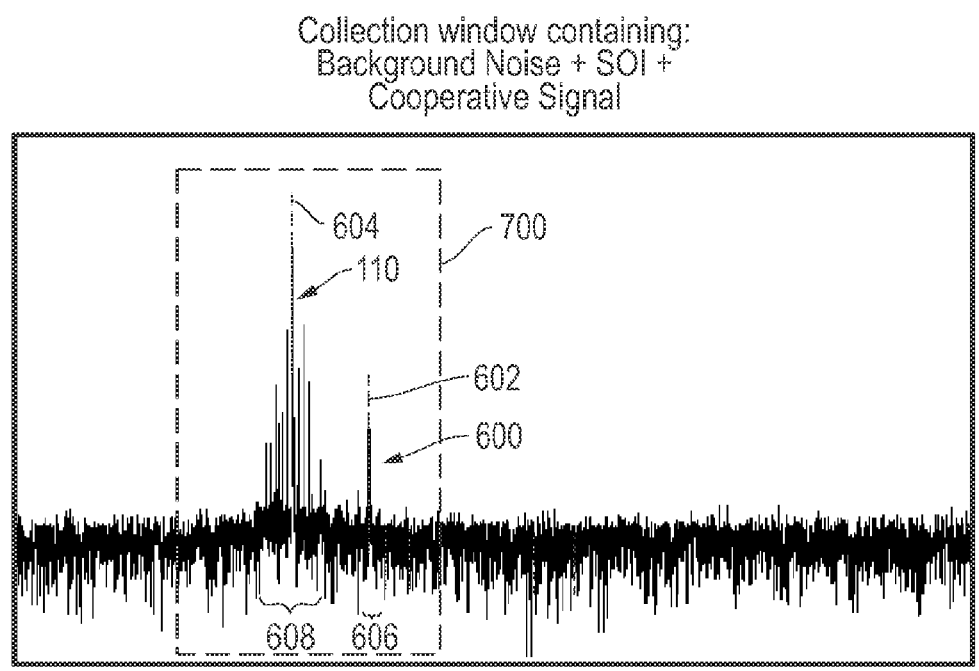
FIG. 7 illustrates an amplitude versus frequency spectrogram of an EM emissions environment according to one exemplary embodiment of the disclosed systems and methods.

In one embodiment, the same bandwidth collection frequency window may be specified and captured by each of multiple sensing platforms 202. FIG. 7 illustrates an exemplary collection frequency window 700 that may be specified by such tasking information to contain the signal of interest 110 together with the cooperative EM signal 600 of FIG. 6. In this regard, bandwidth of a collection frequency window 700 may be controlled and varied, for example, by filtering and/or digital sampling implemented within receiver circuitry 214 of each EM sensing platform 202, such that data of the selected collection frequency window 700 is provided in digital form to signal processing circuitry 212 of the same EM sensing platform 202. It will be understood that in another exemplary embodiment, separate synchronized collection frequency windows may be employed to simultaneously capture the signal interest 110 separately from the cooperative EM signal 600.

Captured data from the sensing platform collection sites (that includes timing and frequency information for the captured signal of interest 110 and the cooperative EM signal (e.g., cooperative EM signal 219 of FIG. 2) may then be transmitted in step 308 to a single processing location for further processing (e.g., transmitted from sensing platforms $202_1$ and $202_2$ to sensing platform $202_N$, or in another embodiment from sensing platforms $202_1$, $202_2$ and $202_N$ to a separate independent processing platform). The timing and frequency information for the captured signal of interest 110 may include, for example, center frequency and bandwidth of the signal of interest 110, I and Q data from the digital receiver, task assignment identification, etc.

In step 310 of FIG. 3, timing data for the cooperative EM signal transmitted from the cooperative transmitter is then calculated relative to each data set received at the signal processing location (e.g., sensing platform $202_N$) from one of the EM sensing platform collection sites 202 that is remote to the processing location. This timing data may represent the phase difference between the different EM sensing platforms 202 and may be calculated, for example, by deriving a common clock for each given sensing platform based on one or more signal timing characteristics of the EM signal of interest at the given sensing platform 202. Next, in step 312, the timing information for the captured signal of interest 110 is adjusted for the data set received from each given EM sensing platform collection site 202 based on the calculated timing phase difference between the sensing platforms 202 and the known true location of the cooperative transmitter relative to the given EM sensing platform collection site 202. This may be accomplished, for example, by cross ambiguity plane processing. Then in step 314, the geolocation data for the emitter 104 of the signal of interest 110 is calculated using TDOA-based location methodology (e.g., such as TDOA/TDOA, TDOA/FDOA, etc.) and the adjusted timing information of step 312 for the captured signal of interest 110.

In the practice of the disclosed systems and methods, a TDOA-based geolocation methodology may be implemented in step 314 using any TDOA processing technique or any combination of TDOA and FDOA processing techniques that is suitable for determining the geolocation of RF emissions. Examples of such combinations include TDOA/TDOA and TDOA-based processing techniques.

For example, using one exemplary TDOA-based processing technique, the time difference (TDOA) in reception of an EM signal of interest 110 from an emitter 104 of unknown location at each of two spaced-apart sensing platforms $202_1$ and $202_2$ may be used to define a hyperboloid upon which the emitter 104 is located. Frequency difference (FDOA) in reception of the same radio signal at the two spaced sensing platforms $202_1$ and $202_2$ may be generated, e.g., by moving the spaced sensing platforms at different velocities and headings relative to the emitter 104 to further resolve the geolocation of the radio emitter. If the given emitter 104 is located on the surface of the earth, the intersection of the TDOA hyperboloid, the FDOA surface, and the surface of the earth may be employed to determine a set of possible geolocations for the given emitter 104, with one of these possible geolocations being real, and the other possible geolocations in the set being purely mathematical solutions that are not the real location of the given emitter 104. The real geolocation may be determined by producing a line of bearing, from a third sensing platform $202_N$ that can measure an independent TDOA-based set of data, or by repositioning the original two spaced sensing platforms $202_1$ and $202_2$ and then measuring a second TDOA-based set of data.

In another example, where sufficient time exists for measuring more than one set of TDOA-based data from the given emitter, only two moving sensing platforms $202_1$ and $202_2$ may be required to determine the geolocation of the EM emitter 104 of the signal of interest 110. In such a case, a first set of TDOA-based data may be first measured at a first set of locations of the two spaced sensing platforms $202_1$ and $202_2$, followed by flying the two sensing platforms to a second set of spaced-apart locations and measuring a second set of TDOA-based data at the second and new sensing platform locations. The recomputed set of TDOA-based data from the second set of sensing platform locations may then be compared to the set of TDOA-based data computed at the first set of sensing platform locations to obtain a single overlapping answer for the geolocation of the emitter.

In another embodiment, using a TDOA/TDOA technique, the time difference (TDOA) in reception of a radio signal received at three sensing platforms $202_1$, $202_2$ and $202_N$ may be used to define two hyperboloids upon which the emitter 104 is located. If the emitter 104 is located on the surface of the earth, the intersection of the two TDOA hyperboloids and the surface of the earth may be employed to determine a set of possible geolocations for the given emitter 104, with one of these possible geolocations being real, and the other possible geolocations in the set being purely mathematical solutions that are not the real location of the given emitter 104. The real geolocation may be determined as previously described.

Further information on configuration of sensing platforms, emitters, and TDOA-based geolocation systems and methods that may be implemented in the practice of the disclosed systems and methods may be found in U.S. Pat. Nos. 7,626,546; 7,508,344; 7,456,788; 7,489,937; and 7,471,245, each of which is incorporated herein by reference in its entirety. In addition, any suitable TDOA-based geolocation algorithm may be employed in the practice of the disclosed systems and methods, for example, as described in "Positioning Using Time-Difference of Arrival Measurements" by Fredrik Gustafsson and Fredrik Gunnarsson, Department of Electrical Engineering, Linkoping University, Linkoping, Sweden, which is incorporated herein by reference.

It will be understood that the illustrated order of steps of methodology 300 is exemplary only, and the order of the illustrated steps may be varied to any other order that is suitable for using a cooperative TDOA-based location methodology to determine the location of an electromagnetic radiation emitter. Further, it is possible that additional, alternative or fewer steps may be implemented in any other manner that is suitable for determining the location of an electromagnetic radiation emitter using at least two EM radiation sensing platforms of known location in combination with at least one cooperative transmitter that transmits a cooperative electromagnetic (EM) signal from a known location that is received at the two or more different EM radiation sensing platforms.

It will also be understood that one or more of the tasks, functions, or methodologies described herein (e.g., including those performed by processing device 204, local memory and/or memory buffer 208, and TDOA-based processing and control circuitry 220) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device such as CPU, controller, microcontroller, processor, microprocessor, FPGA, ASIC, or any other suitable processing device) to perform one or more steps of the methodologies disclosed herein. A computer program of instructions may be stored in or on the non-transitory computer-readable medium (e.g., such as memory 208) residing on or accessible by a processing device (e.g., processing device 204 or a processing device of circuitry 220) for instructing the processing device to execute the computer program of instructions. The computer program of instructions may include an ordered listing of executable instructions for implementing logical functions in the processing device. The executable instructions may comprise a plurality of code segments operable to instruct the processing device to perform the methodologies disclosed herein. It will also be understood that one or more steps of the present methodologies may be employed in one or more code segments of the computer program. For example, a code segment executed by the processing device may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of determining a time difference of arrival (TDOA) information for an electromagnetic (EM) signal of interest that is transmitted in an EM emissions environment, comprising:
    providing multiple EM sensing platforms within the EM emissions environment, the EM emissions environment including the EM signal of interest, and the EM signal of interest having a center frequency and bandwidth;
    transmitting a cooperative EM signal from a source of known location simultaneously with the transmission of the EM signal of interest;
    simultaneously capturing each of the EM signal of interest and the cooperative EM signal at each of the multiple EM sensing platforms while the sensing platforms are positioned at different geolocations from each other;
    deriving a common clock for EM data captured at each given one of the EM sensing platforms based on one or more signal timing characteristics of the EM cooperative signal at the given EM sensing platform and based on the known location of the source of the EM cooperative signal and the known location of the given EM sensing platform at the same time the EM data is captured at each given one of the multiple EM sensing platforms; and
    determining the time difference of arrival (TDOA) information for the EM signal of interest between at least two of the multiple EM sensing platforms based on the common clock derived based on the one or more signal timing characteristics of the EM cooperative signal at each given one of the EM sensing platforms.

2. The method of claim 1, further comprising:
    detecting the EM signal of interest;
    determining one or more frequency characteristics of the detected signal of interest;
    transmitting the cooperative EM signal from the source of known location simultaneously with the transmission of the EM signal of interest such that the cooperative EM signal is based at least in part on the determined frequency characteristics of the detected signal of interest so that it has a center frequency that is placed at a selected distance from the center frequency of the EM signal of interest and such that the cooperative EM signal has a bandwidth that does not overlap the bandwidth of the EM signal of interest; and
    simultaneously capturing each of the EM signal of interest and the cooperative EM signal at each of the EM sensing platforms in a same collection frequency window.

3. The method of claim 2, further comprising transmitting the cooperative EM signal from the source of known location simultaneously with the transmission of the EM signal of interest such that the cooperative EM signal has a center frequency that is placed at a frequency position relative to the center frequency of the EM signal of interest that is positioned outside the collection frequency window but that folds with analog to digital sampling into a closer relationship with the EM signal of interest such that the folded EM signal of interest is within the collection frequency window.

4. The method of claim 3, where the frequency position of the center frequency of the cooperative EM signal is a harmonic of the EM signal of interest.

5. The method of claim 2, where each of the EM sensing platforms comprises an antenna coupled to receiver circuitry; and where the method further comprises simultaneously capturing each of the EM signal of interest and the cooperative EM signal at each given one of the EM sensing platforms in the same collection frequency window using the same antenna and the same receiver circuitry of the given EM sensing platform.

6. The method of claim 5, where each of the EM sensing platforms further comprises signal processing circuitry coupled to the receiver circuitry; and where the method further comprises:
    providing digital signal data of the captured collection frequency window from the receiver circuitry to the signal processing circuitry, the signal data comprising sampled data from the EM signal of interest together with sampled data from the cooperative EM signal; and
    using the signal processing circuitry to process the digital signal data from the EM signal of interest and the digital signal data from the cooperative EM signal on at least one of a time basis, a frequency basis, or a combination thereof.

7. The method of claim 1, where an emitter of the EM signal of interest has an unknown geolocation; and where the method further comprises using TDOA-based geolocation methodology to determine the geolocation of the emitter of the EM signal of interest based at least in part on the determined TDOA information for the EM signal of interest between at least two of the multiple EM sensing platforms.

8. The method of claim 1, wherein at least one of the EM sensing platforms is moving relative to an emitter of the EM signal of interest.

9. The method of claim 1, wherein the one or more signal timing characteristics comprises at least one of time of arrival of the cooperative EM signal at the given EM sensing platform, or time of receipt of at least one signature within the cooperative EM signal at the given EM sensing platform.

10. The method of claim 1, further comprising:
    transmitting the cooperative EM signal from the source of known location simultaneously with the transmission of the EM signal of interest such that the cooperative EM signal has a center frequency that is placed at a distance from the center frequency of the EM signal of interest and such that the cooperative EM signal has a bandwidth that does not overlap the bandwidth of the EM signal of interest; and simultaneously capturing each of the EM signal of interest and the cooperative EM signal at each of the EM sensing platforms in different collection frequency windows.

11. The method of claim 1, where at least a given one of the multiple EM sensing platforms comprises transceiver or transmitter circuitry coupled between signal processing circuitry and a communication antenna; and where the method further comprises:

using the transceiver or transmitter circuitry to transmit at least one of processed emitter signal information or control signals from the signal processing circuitry via the communication antenna to at least one other of the multiple EM sensing platforms;

determining the geolocation of the given one of the multiple EM sensing platforms; and using the transceiver or transmitter circuitry to transmit the cooperative EM signal from the given one of the multiple EM sensing platforms via the communication antenna simultaneously with the transmission of the EM signal of interest, the geolocation of the given one of the multiple EM sensing platforms being determined and known during transmission of the cooperative EM signal.

12. The method of claim 1, further comprising:

providing at least of the multiple EM sensing platforms as a pre-existing EM sensing platform that includes transceiver or transmitter circuitry coupled between signal processing circuitry and a communication antenna, the transceiver or transmitter circuitry being configured to transmit at least one of processed emitter signal information or control signals from the signal processing circuitry via the communication antenna to at least one other of the multiple EM sensing platforms; and modifying the pre-existing EM sensing platform to be a modified EM sensing platform by adding cooperative transmitter and processing control circuitry coupled to the transceiver or transmitter circuitry; and using the cooperative transmitter and processing control circuitry to cause transmission of the cooperative EM signal from the modified EM sensing platform via the communication antenna.

13. A system to determine a time difference of arrival (TDOA) information for an electromagnetic (EM) signal of interest that is transmitted in an EM emissions environment, comprising:

multiple EM sensing platforms configured to simultaneously receive EM signals of interest in the EM emissions environment while the EM sensing platforms are positioned at different known geolocations from each other;

at least one cooperative EM signal transmission platform comprising circuitry configured to transmit a cooperative EM signal from the cooperative EM signal transmission platform simultaneously with the transmission of the EM signal of interest while the cooperative EM signal transmission platform has a known geolocation; and TDOA-based processing and control circuitry in signal communication with the multiple EM sensing platforms and the cooperative EM signal transmission platform, the TDOA-based processing and control circuitry being configured to:

derive a common timing relationship for EM data captured at each given one of the EM sensing platforms based on one or more signal timing characteristics of the EM cooperative signal at the given EM sensing platform and based on the known location of the source of the EM cooperative signal and the known location of the given EM sensing platform at the same time the EM data is captured at each given one of the multiple EM sensing platforms, and determine the time difference of arrival (TDOA) information for the EM signal of interest between at least two of the multiple EM sensing platforms based on the timing relationship derived based on the one or more signal timing characteristics of the EM cooperative signal at each given one of the EM sensing platforms.

14. The system of claim 13, where each given one of the EM sensing platforms comprises signal processing circuitry configured to process EM signals of interest received at the given EM sensing platform on a time basis to produce time-processed EM signal data; where each of the multiple EM sensing platforms is further configured to receive the cooperative EM signal and use the signal processing circuitry to process the received EM signal on a time basis to produce time-processed cooperative EM signal data; and where the TDOA-based processing and control circuitry is further configured to receive the time-processed EM signal data and the time-processed cooperative EM signal data from each one of the multiple EM sensing platforms.

15. The system of claim 13, where one of the multiple EM sensing platforms comprises the TDOA-based processing and control circuitry.

16. The system of claim 13, where at least one of the multiple EM sensing platforms is configured as a cooperative EM signal transmission platform.

17. The system of claim 13, where the at least one cooperative EM signal transmission platform is configured to determine one or more frequency characteristics of a signal of interest detected by at least one of the multiple EM sensing platforms or the cooperative EM signal transmission platform; transmit the cooperative EM signal from the source of known location simultaneously with the transmission of the EM signal of interest such that the cooperative EM signal is based at least in part on the determined frequency characteristics of the detected signal of interest so that it has a center frequency that is placed at a selected distance from the center frequency of the EM signal of interest and such that the cooperative EM signal has a bandwidth that does not overlap the bandwidth of the EM signal of interest; and simultaneously capture each of the EM signal of interest and the cooperative EM signal at each of the EM sensing platforms in a same collection frequency window.

18. The system of claim 17, where the at least one cooperative EM signal transmission platform is configured to transmit the cooperative EM signal from the source of known location simultaneously with the transmission of the EM signal of interest such that the cooperative EM signal has a center frequency that is placed at a frequency position relative to the center frequency of the EM signal of interest that is positioned outside the collection frequency window but that folds with analog to digital sampling into a closer relationship with the EM signal of interest such that the folded EM signal of interest is within the collection frequency window.

19. The system of claim 18, where the frequency position of the center frequency of the cooperative EM signal is a harmonic of the EM signal of interest.

20. The system of claim 18, where each of the EM sensing platforms comprises an antenna coupled to receiver circuitry; and where the multiple EM sensing platforms are configured to simultaneously capture each of the EM signal of interest and the cooperative EM signal in the same collection frequency window using the same antenna and the same receiver circuitry of the given EM sensing platform.

21. The system of claim 20, where each of the EM sensing platforms further comprises signal processing circuitry coupled to the receiver circuitry; and
where the receiver circuitry of each given one of the EM sensing platforms is configured to provide digital signal data of the captured collection frequency window from to the signal processing circuitry of the given one of the EM sensing platforms, the signal data comprising sampled data from the EM signal of interest together with sampled data from the cooperative EM signal; and
where the signal processing circuitry of each given one of the EM sensing platforms is configured to process the digital signal data from the EM signal of interest and the digital signal data from the cooperative EM signal on at least one of a time basis, a frequency basis, or a combination thereof.

22. The system of claim 13, where the TDOA-based processing and control circuitry is further configured to use TDOA-based geolocation methodology to determine the geolocation of the emitter of the EM signal of interest based at least in part on the determined TDOA information for the EM signal of interest between at least two of the multiple EM sensing platforms.

23. The system of claim 13, wherein at least one of the EM sensing platforms is a mobile EM sensing platform configured to move relative to an emitter of the EM signal of interest.

24. The system of claim 13, wherein the one or more signal timing characteristics comprises at least one of time of arrival of the cooperative EM signal at the given EM sensing platform, or time of receipt of at least one signature within the cooperative EM signal at the given EM sensing platform.

25. The system of claim 13, here the at least one cooperative EM signal transmission platform is configured to transmit the cooperative EM signal from known location simultaneously with the transmission of the EM signal of interest such that the cooperative EM signal has a center frequency that is placed at a distance from the center frequency of the EM signal of interest and such that the cooperative EM signal has a bandwidth that does not overlap the bandwidth of the EM signal of interest; and where the each of the multiple EM sensing platforms is configured to simultaneously capture each of the EM signal of interest and the cooperative EM signal in different collection frequency windows.

26. The system of claim 13, where at least a given one of the multiple EM sensing platforms comprises transceiver or transmitter circuitry coupled between signal processing circuitry and a communication antenna; where the transceiver or transmitter circuitry is configured to transmit at least one of processed emitter signal information or control signals from the signal processing circuitry via the communication antenna to at least one other of the multiple EM sensing platforms; where the at least a given one of the multiple EM sensing platforms further comprises location determination circuitry for determining the geolocation of the given one of the multiple EM sensing platforms; and where the transceiver or transmitter circuitry is further configured to transmit the cooperative EM signal from the given one of the multiple EM sensing platforms via the communication antenna simultaneously with the transmission of the EM signal of interest, the geolocation of the given one of the multiple EM sensing platforms being determined and known by the location circuitry during transmission of the cooperative EM signal.

27. A cooperative EM signal transmission platform, comprising:
a communication antenna;
transceiver or transmitter circuitry coupled to the communications antenna and configured to communicate with one or more EM sensing platforms in an an EM emissions environment;
TDOA-based processing and control circuitry coupled to the transceiver circuitry and being configured to communicate with the multiple EM sensing platforms to receive EM data from each of the multiple EM sensing platforms via the transceiver circuitry and communications antenna, the TDOA-based processing and control circuitry being configured to determine the time difference of arrival (TDOA) information for an EM signal of interest between at least two of the multiple EM sensing platforms based on a common timing relationship derived based on one or more signal timing characteristics of an EM cooperative signal at each given one of the EM sensing platforms; and
cooperative transmitter and processing control circuitry coupled to the transceiver or transmitter circuitry configured to cause transmission of the cooperative EM signal from the cooperative EM signal transmission platform via the transceiver or transmitter and the communication antenna.

28. A method of operating a cooperative EM signal transmission platform in an EM emissions environment, comprising:
providing a cooperative EM signal transmission platform that includes:
a communication antenna,
transceiver or transmitter circuitry coupled to the communications antenna,
TDOA-based processing and control circuitry coupled to the transceiver or transmitter circuitry, and
cooperative transmitter and processing control circuitry coupled to the transceiver or transmitter circuitry;
using the TDOA-based processing and control circuitry to communicate with multiple other EM sensing platforms in the EM emissions environment to receive EM data from each of the multiple EM sensing platforms via the transceiver circuitry and communications antenna;
using the TDOA-based processing and control circuitry to determine the time difference of arrival (TDOA) information for an EM signal of interest between at least two of the multiple EM sensing platforms based on a common clock derived based on one or more signal timing characteristics of an EM cooperative signal at each given one of the EM sensing platforms; and
using the cooperative transmitter and processing control circuitry to cause transmission of the cooperative EM signal from the cooperative EM signal transmission platform via the transceiver or transmitter and the communication antenna.

* * * * *